United States Patent
Rosenfield et al.

[15] 3,689,695
[45] Sept. 5, 1972

[54] VEHICLE VIEWING SYSTEM

[72] Inventors: Harry C. Rosenfield, 22571 Margarita Drive, Woodland Hills, Calif. 91364; Chang C. Chen, 984 Ashbridge Lane, Harbor City, Calif. 90710

[22] Filed: April 10, 1970

[21] Appl. No.: 27,321

[52] U.S. Cl.......178/7.81, 178/DIG. 1, 178/DIG. 23, 178/DIG. 30
[51] Int. Cl..............................................H04n 7/18
[58] Field of Search.........178/DIG. 1, 7.81, DIG. 23, 178/DIG. 30, 6.5

[56] References Cited

UNITED STATES PATENTS

| 3,504,122 | 3/1970 | Ratliff..........................178/6.5 |
| 3,437,753 | 4/1969 | Stith......................178/DIG. 1 |
| 3,251,933 | 5/1966 | Beste...........................178/6.5 |

FOREIGN PATENTS OR APPLICATIONS

| 1,106,339 | 3/1968 | Great Britain........178/DIG. 1 |
| 521,452 | 3/1955 | Italy......................178/7.2 ST |
| 934,037 | 8/1963 | Great Britain........178/DIG. 1 |

OTHER PUBLICATIONS

Closed Circuit TV Systems- Prepared by Govt. Service Dept. RCA Service Co.- pp. 209, 210

*Primary Examiner*—Robert L. Griffin
*Assistant Examiner*—Joseph A. Orsino, Jr.
*Attorney*—Julius L. Rubinstein

[57] ABSTRACT

A television camera is mounted on a support in a motor vehicle. The support is designed to permit the camera to have vertical movement, horizontal movement, rotary movement, tilting movement, and lateral movement across the width of the vehicle. A viewing system is mounted in the cab of the vehicle comprising three persistent image cathode ray display tubes. Rotation of the camera on a vertical axis plus appropriate control circuits provides three simultaneous continuous views of selected regions around the vehicle.

5 Claims, 9 Drawing Figures

PATENTED SEP 5 1972
3,689,695
SHEET 1 OF 3
FIG. 1
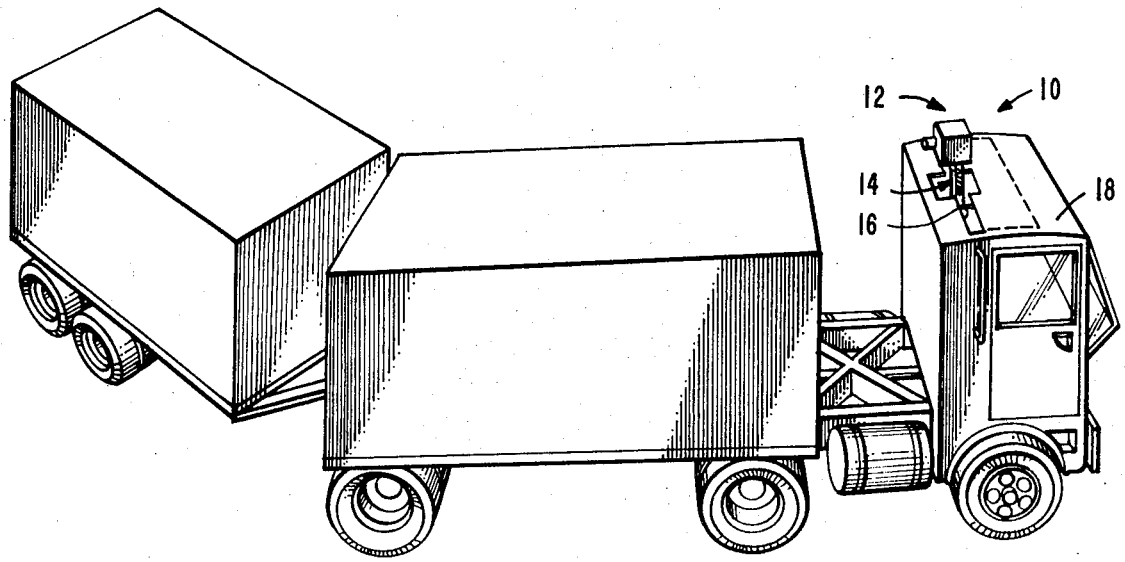
FIG. 2
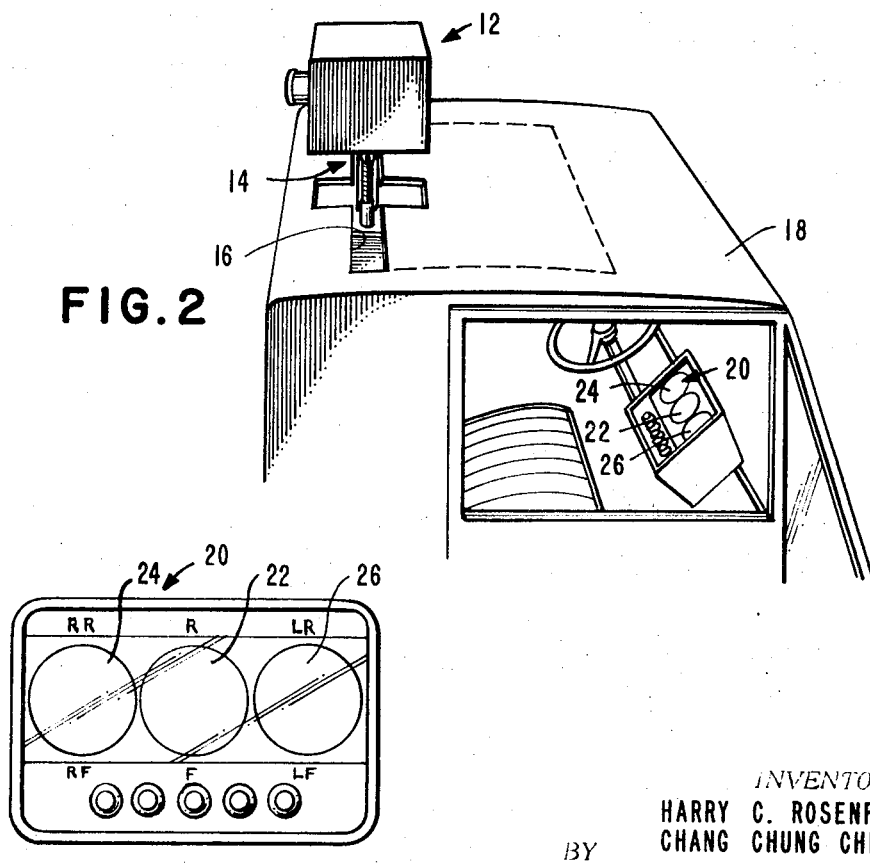
FIG. 3
INVENTORS
HARRY C. ROSENFIELD
CHANG CHUNG CHEN
BY
Julius L. Rubinstein
ATTORNEY

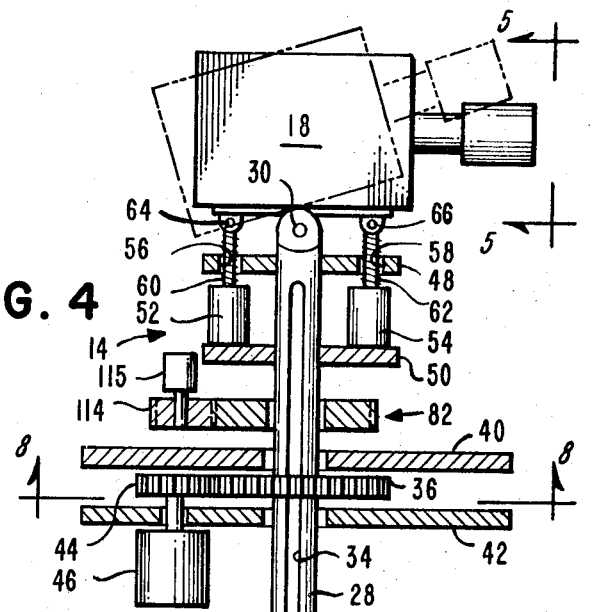

VEHICLE VIEWING SYSTEM

This invention relates generally to a vehicle viewing system and more particularly to a television camera and display system for use with motor vehicles.

BRIEF SUMMARY AND BACKGROUND

The present high collision rate on the nation's highways and streets has pointed out the inadequacy of present rear and side view mirrors on automobiles and trucks, and particularly on trucks with one or more following trailers. Furthermore, the inadequacy of these rear and side view mirrors has had a restricting influence on the design of motor vehicles in that to an increasing degree the requirement for rear and side view visibility has caused a substantial increase in the size of the rear and side rear windows. This in turn has caused a weakening of the roof structure of the motor vehicle making the passenger and driver of the vehicle more susceptible to injuries in case of collision.

Recent developments in design of television cameras and viewers has led to a substantial miniaturization of these components along with a large decrease in their cost. If such a television camera were appropriately mounted on a motor vehicle with one or more small viewers located inside the motor vehicle, the design of motor vehicles could be free from their present restrictions which could result in a decrease in their cost. In addition, the increase in all weather visability permitted with a vehicle mounted television camera could substantially increase the safety of the vehicle resulting in less frequent collisions caused by inadequate visability when changing lanes. This is particularly true when a truck is hauling one or more trailers.

Similarly, such a television camera and display system mounted on a boat, for example, along with a telescopic zoom lens and appropriate circuitry for selectively sensitizing the camera to infra-red or ultraviolet light would materially help navigation at night or under conditions of poor visibility.

What is needed therefore, and comprises an important object of this invention, is to provide a low cost miniaturized television camera and receiver system on a vehicle in such a way that views of different areas around the vehicle can be selectively observed by the driver.

Other objects and advantages of this invention will become more apparent when better understood in the light of the drawings and accompanying specification, wherein:

FIG. 1 discloses a truck hauling two trailers with a television camera mounted on the roof of the truck.

FIG. 2 discloses an enlarged view of the roof of a truck showing the television camera extending out of a compartment in the roof and showing the mounting position for the television display inside the cab of the truck.

FIG. 3 shows an elevational view of the television display inside the cab of a truck.

FIG. 4 discloses an elevational view of the television camera and the mounting structure.

FIG. 5 discloses an end view of a television camera taken in a line 5—5 of FIG. 4.

FIG. 6 discloses the rotary switch arrangement for selectively controlling the regions around the vehicle to be displayed on the television display.

FIG. 7 discloses a part of the switching arrangement for selectively controlling the region around the vehicle to be viewed.

FIG. 8 is a sectional view taken on the line 8—8 of FIG. 4.

Figure 6:
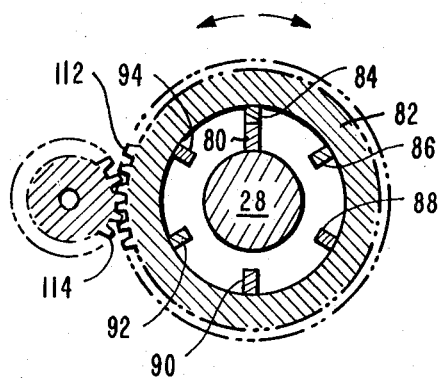

Referring now to FIG. 1 of the drawing, a truck hauling a plurality of trailers indicated generally by the reference numeral 10 has a miniaturized television camera 12 mounted on it's roof. As best seen in FIG. 2, the television camera is mounted on a support indicated generally by the reference numeral 14 which is mounted inside an apparatus receiving compartment 16 in the rear of the cab 18 of the truck.

A television display 20 comprising (in this particular embodiment) three small persistent image cathode ray tubes 22, 24 and 26 is mounted in the passenger section 18, see FIG. 3.

The television camera 12 is pivotally mounted on a support rod 28 on pivot pin 30, see FIG. 4. The support rod is extensibly mounted inside of a hydraulic cylinder 32 so that the camera 12 may be raised or lowered as desired over the roof of the truck.

In addition, support rod 28 is provided with a longitudinally extending groove 34. The support rod 28 extends through the center of a gear 36. This gear is provided with an internal tooth 38 which rides in groove 34. In this way rotation of gear 36 causes the rod 28 to rotate, see FIG. 8.

Gear 36 is held in position between support plates 40 and 42. Gear 36 engages a gear 44 driven by a motor 46. With this arrangement operation of the motor 46 causes gear 36 to rotate and this causes camera 12 to rotate. In addition, the camera 12 can rotate at the same time it is being raised and lowered by actuation of the hydraulic cylinder 32.

In order to tilt the camera support plates 48 and 50 are mounted on and movable with support rod 28. Solenoids 52 and 54 are mounted on support plate 50 on opposite sides of pivot 30. These solenoids have magnetic rods 60 and 62 which extend up through openings 56 and 58 in support plate 48. The free ends of these rods are attached to the camera housing.

Coil springs 64 and 66 are connected between each end of a solenoid rod and the body of the camera 12, see FIG. 4. With this arrangement, when one or the other of the solenoids is energized the associated solenoid rod is retracted tilting the camera to a degree related to the electric current in the solenoid. When current to the solenoid is cut off, the coil springs return the camera to a horizontal position.

Although a pair of solenoids and coil springs have been used to tilt the camera, in this particular embodiment, it is apparent that other means for tilting the camera can be used, such as mounting a gear on the pivot pin 30 and rotating the gear by means of a motor and drive gear in a manner well known in the arts.

As shown in FIG. 4, the bottom 68 of the hydraulic cylinder 32 is bored and threaded so it functions as a nut. A threaded rod 72 extends through the bore 70. This rod extends substantially the width of the truck.

A gear 74 is rigidly fixed to rod 72 and this gear meshes with a gear 76 driven by a reversible motor 78. With this arrangement, operation of the motor 78 rotates gear 74 and rod 72 causing the hydraulic cylinder to move axially in either direction on rod 72. The opposite ends of rod 72 are rotatably mounted on bearings (not shown).

In summary to this point, operation of motor 78 causes the camera 12 to move along the width of the truck. Operation of the hydraulic cylinder 32 raises or lowers the camera over the roof of the truck. Operation of solenoids 52 and 54 tilt the camera, and operation of motor 46 rotates the camera.

As stated above, in this particular embodiment the television display includes three persistent image cathode ray tubes. Support rod 38 is provided with a radially extending wiper contact 80 which rotates with support rod 28, see FIG. 6. A rotatably mounted support ring 82 is concentric with support rod 28. This support ring is provided, in this particular embodiment, with six radially inwardly projecting contacts 84, 86, 88, 90, 92 and 94. These contacts are positioned so they are sequentially engaged by the rotating wiper contact 80 for reasons to become apparent below.

Figure 7:
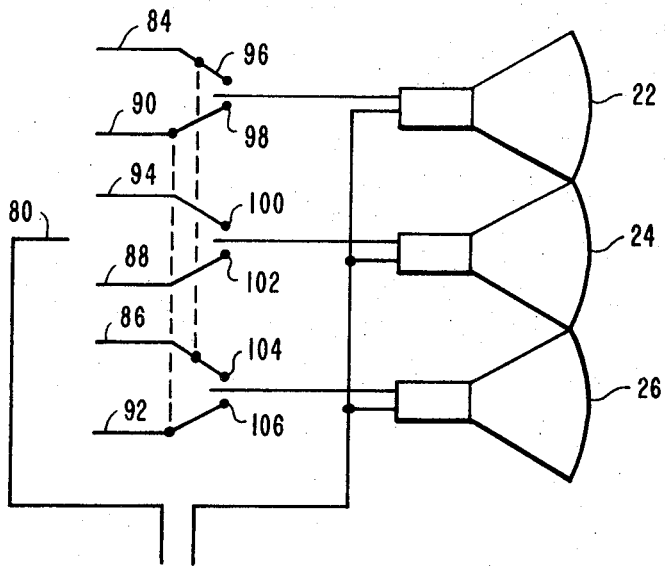

Switch pairs 96 and 98, 100 and 102 and 104 and 106 are adapted to be connected to cathode ray tubes 22, 24 and 26 respectively, see FIG. 7. Switches 96, 100 and 104 are mechanically connected together to work in unison and similarly switches 98, 102 and 106 are mechanically connected together to work in unison. Furthermore, support ring 82 is normally aligned so contacts 84 and 90 define a line parallel to the length of the vehicle on the diameter of a circle defined by the rotating wiper contact 80 with contact 84 at the front of the vehicle and contact 90 at the rear. With this arrangement it can be seen that wiper contact 80 engages contact 84 when camera 12 is pointing directly forward, and wiper contact 80 engages contact 90 when the camera is pointing directly rearwardly.

Similarly, wiper contact 80 engages contact 86 and 94 when the camera 12 is pointing 45° to the right and left of the forward direction, and wiper contact 80 engages contacts 92 and 88 when he camera is pointing 45 degrees right and left respectively from the rear of the vehicle.

As seen in FIG. 7, when switches 98, 102 and 106 are closed, contacts 88, 90 and 92 are connected to the persistent image cathode ray tubes. With this arrangement when motor 46 is energized and camera 12 rotates, cathode ray tube 22 projects an image of the view directly to the rear of the vehicle, or in this case a truck trailer combination, while cathode ray tubes 24 and 26 display images of views at 45° angles vehicle the right and left of the rear of the vehicle when contact 80 wipes against contacts 88, 90 and 92 respectively. The speed of rotation of camera 12 must be fast enough so that the image viewed by the camera persists on the cathode ray tubes until the camera makes a complete revolution so wiper contact 80 again engages the appropriate fixed contacts to re-energize the images on the cathode ray tubes.

With this arrangement described so far, a single camera provides simultaneous views on three cathode ray tubes of the view directly to the rear of the vehicle or last trailer, and to regions at 45° angles to the rear of the vehicle or trailer and does not see any views forward of the vehicle. To this point the contacts 94, 86, 88 and 92 have been defined as being at 45° angles with respect to the diameter of the support ring 82. It is of course apparent that these contacts could be positioned at any desired angle dependent on the size and shape of the vehicle from which the television camera is mounted and depending on the particular regions it is desired to view.

If switches 96, 100 and 104 are closed, contacts 84, 86 and 94 are energized so cathode ray tube 22 displays an image of the view directly forward of the vehicle while cathode ray tubes 24 and 26 display images (in this particular embodiment) at 45° angles from each side of the forward direction.

As shown in FIG. 6, support ring 82 is provided with gear teeth 112 on it's outer surface. These gear teeth mesh with gear 114 powered by a motor or hand crank 115, so that the direction of view of the television camera 12 may be altered as desired.

It is of course apparent that the camera 12 need not continuously rotate. If desired, the camera could look only in one direction until it's direction of view is altered by the operator of the vehicle. However, if such were the case the camera would not provide simultaneous views of the different sides of the vehicle. It is also apparent that the above-described arrangement would be used with only one cathode ray tube. With this arrangement the direction of view of the camera could be altered as desired by rotating it.

The ability of the television camera to look forward could be useful in conjunction with the above-described television support arrangement when it is desired to see forward and around a vehicle in front of a television camera. Furthermore, the ability of the camera to move laterally on rod 72 permits the camera to see around any vehicles in front of the camera for purposes of passing. To increase it's ability to see around forward vehicles, it is noted in FIG. 5, that the support rod 28 is attached to the inner side 13 of the television camera so that when the camera moves to the end of travel on rod 72 the lense 15 of the camera projects further beyond the edge of rod 72. If this lateral extension is not sufficient, and extensible optical system employing mirrors which project the image into the lens system in a manner well known in the art could be used.

Figure 9:
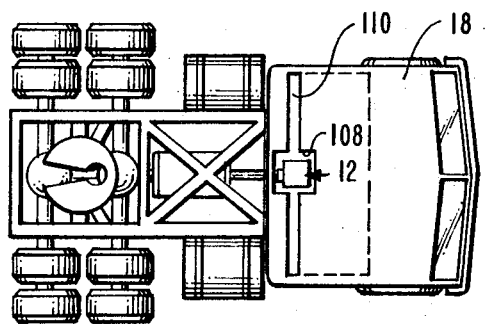
FIG. 9 is a plan view of the roof of the truck showing a recess in the roof to accommodate the television camera when the camera is retracted inside the truck during periods of non-use.

When the television camera is mounted in a vehicle it could be positioned in an apparatus receiving compartment 16 to the rear of the passenger portion of the cab. To protect the camera against inclement weather or theft, a similarly shaped opening 108 could be formed in the roof of the vehicle, so the camera may be retracted therein, see FIG. 9. This roof may be provided with a crank or power actuated sliding door 109 to close off compartment 16 if desired.

It is also noted that the roof is provided with an elongated slot 110 parallel to and above rod 72. Slot 110 is long enough to permit support rod 28 to move therein when the camera is moved across the roof in the direction of the width of the truck cab so that the camera can travel the width of the vehicle.

To this point the camera and projector has been described in conjunction with a motor vehicle such as a truck hauling a trailer. It is of course apparent that this arrangement could be useful when mounted on trains or in boats.

If the device were employed on boats the camera could be provided with a power zoom lens to increase the visibility around the boat. Furthermore, the mounting structure which permits the camera to be raised and lowered might be helpful in raising the camera above the level of waves and spray. It is of course noted that the camera could be sensitized to respond to different kinds of radiation such as infra-red or ultra-violet so that the camera might be useful to guide the boat at night in a wide variety of situations of varying visibility.

Having described the invention, what I claim as new is:

1. A vehicle guidance system for self-propelled highway vehicles for viewing in any direction wherein the highway vehicle has a passenger compartment and an apparatus holding compartment comprising a television camera, an apparatus for positioning the television camera mounted in said apparatus holding compartment, said apparatus comprising a support rod, said television camera pivotally mounted on said support rod, said support rod connected to a vertical side of said television camera so that when said television camera is moved to the side of said vehicle, the lens of said camera projects further beyond the side of said vehicle so the camera can see further around the side of any vehicle in front of the camera, control means for tilting said camera on said support rod, means for raising and lowering said support rod and television camera with respect to the top of said vehicle, whereby said television camera can be retracted inside said apparatus holding compartment, enclosure means for closing off said apparatus receiving compartment to protect said television camera, means for moving said camera and said support rod across the width of said vehicle, means for rotating said support rod and said television camera around the axis of said support rod, and a television display in the passenger compartment displaying the picture viewed by said television camera so selected areas around the vehicle can be observed.

2. The apparatus described in claim 1, including an extensible optical means for effectively increasing the lateral view of a television camera beyond the side of a vehicle.

3. A motor vehicle having a passenger compartment and an apparatus holding compartment, a television camera, an apparatus for positioning the television camera mounted in said apparatus holding compartment, said apparatus comprising a support rod, said television camera pivotally mounted on said support rod, means for controlling the tilt of said camera on said support rod, controllable means for raising and lowering said support rod and said television camera over said vehicle, means for controlling the movement of said television camera to either side of said vehicle, means for continuously rotating said television camera round the axis of the support rod, and a television display comprising three persistent image cathode ray tubes connected to said television camera, and means for providing a simultaneous display of three selected areas around the motor vehicle, said support rod rotatable with said camera, a wiper contact mounted on and rotatable with said support rod, a ring support concentric with said support rod, said ring support having a plurality of contacts mounted therein in a circle in position to be brushed by said rotating wiper contact, said ring support aligned so at least one contact is on a line parallel to the length of the motor vehicle and so that when said wiper contact engages said contact said television camera is pointed directly to the rear of the motor vehicle, whereby each time said wiper contact engages said contact a view of the rear of the motor vehicle is formed on one cathode ray tube, said image persisting on said cathode ray tube until said wiper makes a complete revolution to reinforce said image whereby a substantially continuous view of the rear of the vehicle is maintained.

4. A motor vehicle having a passenger compartment and an apparatus holding compartment, a television camera, an apparatus for positioning the television camera mounted in said apparatus holding compartment, said apparatus comprising a support rod, said television camera pivotally mounted on said support rod, means for controlling the tilt of said camera on said support rod, controllable means for raising and lowering said support rod and said television camera over said vehicle, means for controlling the movement of said television camera to either side of said vehicle, means for continuously rotating said television camera round the axis of the support rod, said television display comprising three persistent image cathode ray tubes connected to said television camera and means for providing a simultaneous display of three selected areas around the motor vehicle, said support rod rotatable with said camera, wiper contact mounted on and rotatable with said support rod, said ring support having six contacts mounted therein in a circle and positioned to be sequentially engaged by said rotating wiper contact, said ring support positioned so at least two contacts are on a line parallel to the length of the vehicle and on the diameter of the circle defined by said rotating by said wiper contact, one forward contact positioned so that when said contact is engaged by said wiper contact the television camera is pointed directly forward, the other rearward contact is positioned so that it is engaged by said wiper contact said television camera is pointing directly rearwardly, the remaining four contacts positioned at pre-determined angles with respect to the forward and rearward contacts for viewing regions at predetermined angles to the front and rear of the motor vehicle, and means for selectively viewing the regions around the vehicle to be displayed on the cathode ray tubes so that when it is desired to view rearwardly one cathode ray tube displays the regions directly to the rear of the vehicle while the remaining two cathode ray tubes display regions at pre-determined angles on both sides on both sides of the rear of the vehicle.

5. Apparatus described in claim 4 wherein including means for rotating said ring support to adjust the alignment of said contact and to control the areas viewed by said television camera.

* * * * *